US012713259B2

(12) United States Patent
Masood et al.

(10) Patent No.: US 12,713,259 B2
(45) Date of Patent: Aug. 18, 2026

(54) IDENTIFYING A PERFORMANCE ISSUE ASSOCIATED WITH A 5G WIRELESS TELECOMMUNICATION NETWORK

(71) Applicant: T-Mobile USA, Inc., Bellevue, WA (US)

(72) Inventors: Usama Masood, Bellevue, WA (US); Oliver Coudert, Arlington, VA (US); Bharatwajan Raman, Arlington, VA (US); Nirmal Chandrasekaran, Hillsborough, NJ (US); Junaid Alam, Denville, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 53 days.

(21) Appl. No.: 19/004,067

(22) Filed: Dec. 27, 2024

(65) Prior Publication Data

US 2025/0142379 A1 May 1, 2025

Related U.S. Application Data

(63) Continuation of application No. 17/884,031, filed on Aug. 9, 2022, now Pat. No. 12,212,988.

(51) Int. Cl.
*H04W 24/08* (2009.01)
*H04W 24/10* (2009.01)

(52) U.S. Cl.
CPC .......... *H04W 24/08* (2013.01); *H04W 24/10* (2013.01)

(58) Field of Classification Search
CPC ............................ H04W 24/08; H04W 24/10
See application file for complete search history.

(56) References Cited

U.S. PATENT DOCUMENTS

| | | | |
|---|---|---|---|
| 7,822,662 | B2 | 10/2010 | Guzik et al. |
| 8,209,360 | B2 | 6/2012 | Tomaszewski |
| 8,332,256 | B2 | 12/2012 | Dey et al. |
| 8,396,709 | B2 | 3/2013 | Lloyd et al. |
| 8,966,055 | B2 | 2/2015 | Mittal et al. |
| 9,210,056 | B1 | 12/2015 | Choudhary et al. |
| 9,439,081 | B1 | 9/2016 | Knebl et al. |

(Continued)

FOREIGN PATENT DOCUMENTS

| | | |
|---|---|---|
| CN | 105634787 A | 6/2016 |
| CN | 106209490 A | 12/2016 |

(Continued)

*Primary Examiner* — Adam D Houston
(74) *Attorney, Agent, or Firm* — Perkins Coie LLP

(57) ABSTRACT

The system obtains KPIs of a cell of a telecommunication network. The system preprocesses the multiple KPIs by reducing noise of the multiple KPIs and normalizing an amplitude of a KPI among the multiple KPIs. The system identifies a performance issue of the network by executing multiple ML models based on the KPIs, where a first ML model is configured to identify a sudden performance degradation, where a second ML model is configured to identify an event leading to a change in a performance trend, where a third ML model is configured to identify a gradual change in the performance trend, and where a fourth ML model is configured to identify whether the cell of the network is nearing a capacity limitation of the cell. The system provides a report based on the identified performance issue.

20 Claims, 9 Drawing Sheets

(56) References Cited

U.S. PATENT DOCUMENTS 9,491,059 B2 11/2016 Fletcher et al.
9,503,919 B2 11/2016 Sofuoglu et al.
9,569,517 B1 2/2017 Smola et al.
9,716,633 B2 7/2017 Premkumar et al.
9,826,412 B2 11/2017 Henderson et al.
9,864,797 B2 1/2018 Fletcher et al.
9,955,488 B2 4/2018 Ouyang et al.
9,985,863 B2 5/2018 Fletcher et al.
10,063,406 B2 8/2018 Tapia et al.
10,229,028 B2 3/2019 Addleman et al.
10,311,376 B2 6/2019 Reddy et al.
10,361,935 B2 7/2019 Udupi et al.
10,373,093 B2 8/2019 Aki et al.
10,374,882 B2 * 8/2019 Sheen ................. H04L 41/0816
10,397,810 B2 8/2019 Yang et al.
10,448,261 B2 * 10/2019 Sofuoglu .............. H04W 16/26
10,530,666 B2 1/2020 Venkitapathi et al.
10,555,191 B1 * 2/2020 Jat ......................... H04W 24/08
10,674,388 B2 6/2020 Tapia et al.
10,708,795 B2 7/2020 Tapia
10,713,063 B1 7/2020 Wilczek
10,735,287 B1 8/2020 Soundrarajan
10,776,719 B2 9/2020 Maheshwari et al.
10,785,101 B2 9/2020 Li et al.
10,832,181 B2 11/2020 Nguyen et al.
10,841,821 B2 11/2020 Soundrarajan
10,846,616 B1 11/2020 Busbridge et al.
10,904,114 B2 1/2021 Thampy et al.
10,938,927 B2 3/2021 Crossley et al.
10,949,325 B1 3/2021 Culibrk et al.
11,006,268 B1 5/2021 Kim et al.
11,018,958 B2 5/2021 Tapia
11,036,700 B2 6/2021 Huang et al.
11,063,842 B1 7/2021 Vasseur et al.
11,109,283 B1 8/2021 Kulkarni et al.
11,113,653 B2 9/2021 Ghosh et al.
11,115,287 B2 9/2021 Soundrarajan
11,115,421 B2 9/2021 Nevatia et al.
11,146,463 B2 10/2021 Tedaldi et al.
11,190,425 B2 11/2021 Padfield et al.
11,210,606 B1 12/2021 Morgan et al.
11,237,806 B2 2/2022 Parthasarathy et al.
11,271,797 B2 3/2022 Yadav et al.
11,275,672 B2 3/2022 Khosrowpour et al.
11,275,775 B2 3/2022 Fletcher et al.
11,281,564 B2 3/2022 Sacco et al.
11,296,936 B2 4/2022 Johnson et al.
11,296,955 B1 4/2022 Fletcher et al.
11,301,288 B2 4/2022 Albasheir
11,337,096 B2 5/2022 Saluja et al.
11,343,373 B1 5/2022 Bodiga et al.
11,343,381 B2 5/2022 Zhang et al.
11,379,779 B2 7/2022 Boyle et al.
11,424,999 B2 8/2022 De Buitlir
11,800,398 B2 * 10/2023 Amer ................ H04W 28/0268
11,832,116 B2 * 11/2023 Soulhi ................... H04L 41/147
11,871,274 B2 * 1/2024 Yao ................... H04W 28/0975
12,028,221 B2 * 7/2024 Saluja ..................... H04L 43/04
12,580,826 B2 * 3/2026 Ly ........................... H04L 41/16
2007/0174228 A1 7/2007 Folting et al.
2013/0066687 A1 3/2013 Dewangan
2016/0014617 A1 1/2016 Sofuoglu et al.
2016/0104093 A1 4/2016 Fletcher et al.
2017/0052957 A1 2/2017 Belletti et al.
2017/0053224 A1 2/2017 Duca et al.
2017/0053225 A1 2/2017 Brummet et al.
2017/0262781 A1 9/2017 Yang et al.
2017/0272319 A1 * 9/2017 Sheen ................... H04W 24/02
2017/0272960 A1 9/2017 Li et al.
2017/0295409 A1 * 10/2017 Simon .................... H04H 60/07
2017/0353361 A1 12/2017 Chopra et al.
2017/0357240 A1 12/2017 Stewart et al.
2018/0184307 A1 * 6/2018 Periyasamy .......... H04M 15/61
2018/0189647 A1 7/2018 Calvo et al.
2018/0242220 A1 * 8/2018 Venkatraman ........ H04W 48/02
2018/0253658 A1 9/2018 Baran et al.
2018/0270126 A1 * 9/2018 Tapia ...................... H04L 41/16
2019/0382007 A1 12/2019 Casas et al.
2020/0084087 A1 * 3/2020 Sharma ................. H04W 24/08
2020/0104392 A1 * 4/2020 Hong .................. G06F 11/3409
2020/0236562 A1 7/2020 Soundrarajan
2020/0252310 A1 * 8/2020 Thampy ................... G06N 3/09
2020/0401936 A1 12/2020 Embarmannar et al.
2021/0073627 A1 3/2021 Sarferaz
2021/0117852 A1 4/2021 Ganesh et al.
2021/0125080 A1 4/2021 Raz et al.
2021/0158260 A1 5/2021 Kolar et al.
2021/0166079 A1 6/2021 Arnold et al.
2021/0201202 A1 7/2021 Simhon
2021/0224699 A1 7/2021 Soundrarajan et al.
2021/0243652 A1 * 8/2021 Yao ....................... H04W 48/18
2021/0279632 A1 9/2021 Di et al.
2021/0295231 A1 9/2021 Cmielowski et al.
2021/0397495 A1 12/2021 Prakash et al.
2022/0019663 A1 1/2022 Stapleton et al.
2022/0022076 A1 * 1/2022 Saluja .................. H04W 24/04
2022/0051283 A1 2/2022 Chen et al.
2022/0101146 A1 3/2022 El et al.
2022/0108227 A1 4/2022 Tan et al.
2022/0114401 A1 4/2022 Cmielowski et al.
2022/0231903 A1 7/2022 Thampy et al.
2022/0237892 A1 7/2022 Anderton-Yang
2022/0240123 A1 7/2022 Zeng
2022/0247858 A1 * 8/2022 Bodiga .................. G06N 20/00
2022/0269984 A1 8/2022 Bigaj et al.
2023/0128007 A1 * 4/2023 Amer .................... H04W 24/02
370/329
2023/0139135 A1 * 5/2023 Soulhi ................... H04W 24/08
370/254
2024/0022492 A1 * 1/2024 Nanda ................... H04L 43/091
2024/0056842 A1 * 2/2024 Masood ................ H04W 24/08
2024/0114349 A1 * 4/2024 Miguel ................... H04L 41/16
2024/0114363 A1 * 4/2024 Miguel ................. H04L 41/145
2024/0171452 A1 * 5/2024 Horemuz ............ H04L 41/0645
2024/0397441 A1 * 11/2024 Dasgupta ................ H04W 8/02
2024/0422594 A1 * 12/2024 Subramanya ......... H04W 24/02
2025/0142379 A1 * 5/2025 Masood ................ H04W 24/08
2025/0220458 A1 * 7/2025 Guha .................... H04W 24/02
2025/0365222 A1 * 11/2025 Khansari ................. H04L 41/16
2025/0365596 A1 * 11/2025 Khansari ............... H04W 16/18
2025/0392985 A1 * 12/2025 Lee ...................... H04B 17/336

FOREIGN PATENT DOCUMENTS

CN 106250385 A 12/2016
CN 107305585 A 10/2017
CN 107729353 A 2/2018
CN 109478013 A 3/2019
CN 109983483 A 7/2019
CN 110059137 A 7/2019
CN 112534963 A 3/2021
CN 113168545 A 7/2021
DE 102020125219 A1 6/2021
DE 112018008032 T5 6/2021
DE 202020005640 U1 11/2021
EP 2750432 A1 7/2014
EP 3076705 A1 10/2016
EP 3104285 A1 12/2016
EP 3392809 A1 10/2018
EP 3443706 A1 2/2019
EP 3447701 A1 2/2019
EP 3552085 A1 10/2019
EP 3644267 A1 4/2020
EP 3690762 A1 8/2020
EP 3712819 A1 9/2020
EP 3729727 A1 10/2020
EP 3782133 A1 2/2021
EP 3849231 A1 7/2021
EP 3868031 A1 8/2021
EP 3901700 A1 10/2021
EP 3901890 A1 10/2021
JP 2016-509801 A 3/2016
JP 2020-129232 A 8/2020
JP 7110217 B2 8/2022

(56) References Cited

FOREIGN PATENT DOCUMENTS

| | | | | | |
|---|---|---|---|---|---|
| KR | 10-2020-0036241 | A | | 4/2020 | |
| KR | 10-2020-0143462 | A | | 12/2020 | |
| KR | 10-2021-0140901 | A | | 11/2021 | |
| WO | 2016/026509 | A1 | | 2/2016 | |
| WO | 2017/063092 | A1 | | 4/2017 | |
| WO | 2017/131623 | A1 | | 8/2017 | |
| WO | 2017/152187 | A1 | | 9/2017 | |
| WO | 2018/107091 | A1 | | 6/2018 | |
| WO | 2018/225003 | A1 | | 12/2018 | |
| WO | 2019/060327 | A1 | | 3/2019 | |
| WO | 2020/086458 | A1 | | 4/2020 | |
| WO | 2020/089896 | A1 | | 5/2020 | |
| WO | 2020/096889 | A1 | | 5/2020 | |
| WO | 2020/115273 | A1 | | 6/2020 | |
| WO | 2020/118019 | A1 | | 6/2020 | |
| WO | 2020/119272 | A1 | | 6/2020 | |
| WO | 2020/125929 | A1 | | 6/2020 | |
| WO | 2020/135510 | A1 | | 7/2020 | |
| WO | 2020/146007 | A1 | | 7/2020 | |
| WO | 2020/160385 | A1 | | 8/2020 | |
| WO | 2020/173724 | A1 | | 9/2020 | |
| WO | 2020/185207 | A1 | | 9/2020 | |
| WO | 2021/170613 | A1 | | 9/2021 | |
| WO | 2021/170617 | A1 | | 9/2021 | |
| WO | 2021/250445 | A1 | | 12/2021 | |
| WO | WO-2024033934 | A1 | * | 2/2024 | ............. G06N 20/20 |
| WO | WO-2024105640 | A1 | * | 5/2024 | ......... H04B 17/3912 |

* cited by examiner

IDENTIFYING A PERFORMANCE ISSUE ASSOCIATED WITH A 5G WIRELESS TELECOMMUNICATION NETWORK

CROSS-REFERENCE TO RELATED APPLICATIONS

This application is a continuation of U.S. patent application Ser. No. 17/884,031, filed on Aug. 9, 2022, entitled IDENTIFYING A PERFORMANCE ISSUE ASSOCIATED WITH A 5G WIRELESS TELECOMMUNICATION NETWORK, which is hereby incorporated by reference in its entirety.

BACKGROUND

Current processes for identifying performance trends that can have a negative impact on wireless telecommunication network performance rely on manual steps, or semi-automated processes, that are labor-intensive, prone to human error, and lead to varied conclusions and inconsistent remedial actions, which may not resolve the technical issue causing the negative impact on the wireless telecommunication network.

BRIEF DESCRIPTION OF THE DRAWINGS

Detailed descriptions of implementations of the present invention will be described and explained through the use of the accompanying drawings.

Figure 1:
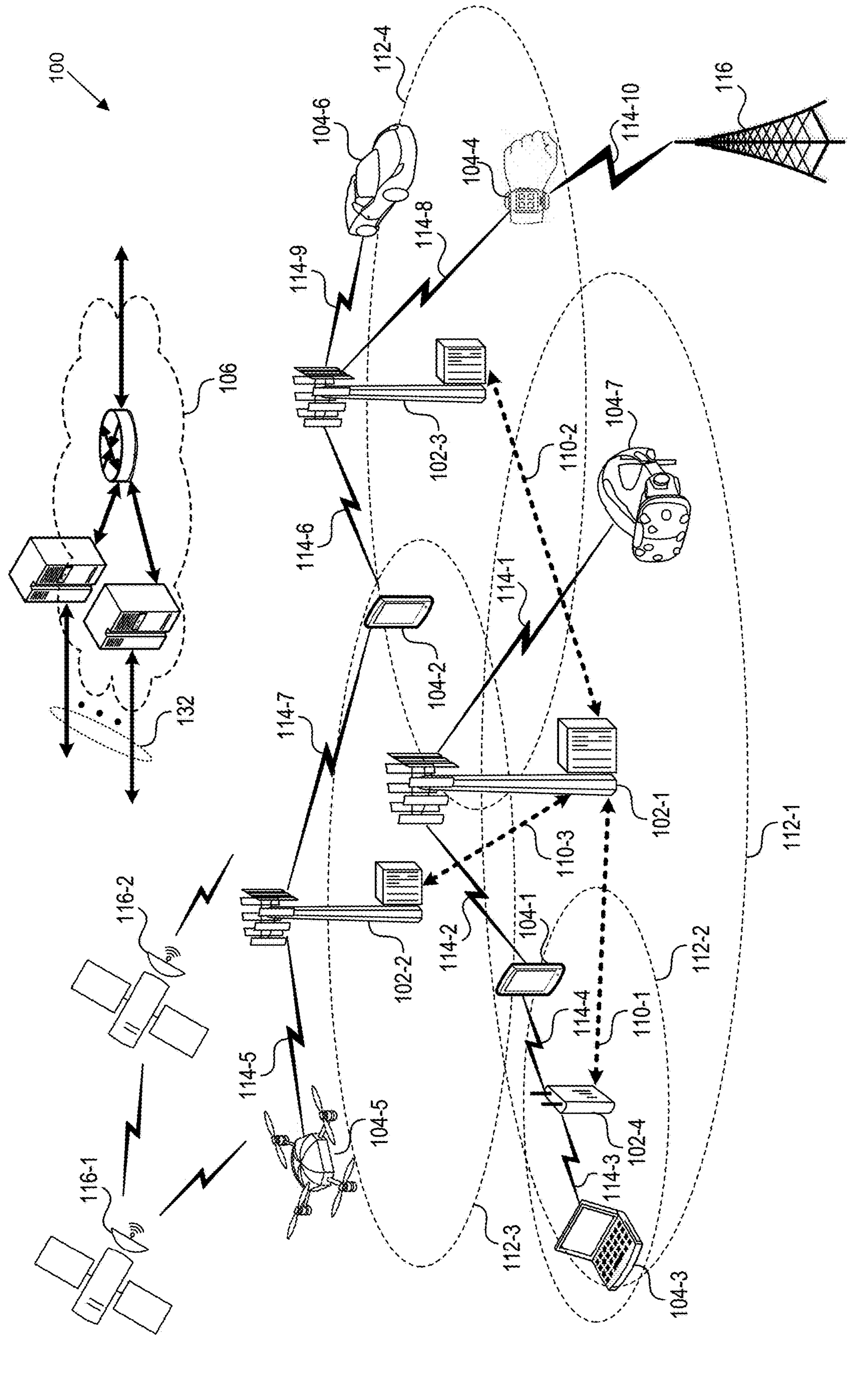
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed system can identify performance issues associated with a wireless telecommunication network, such as a 5G network, by analyzing timeseries of multiple key performance indices (KPIs) to detect abrupt as well as gradual changes in performance. In addition, the disclosed system can forecast future performance of a network, and can use forecasting to set the performance goals for the network.

The system can obtain multiple key performance indices associated with a cell of the 5G wireless telecommunication network. The system can preprocess the multiple KPIs by performing data filtering techniques to reduce noise associated with the multiple KPIs, and by normalizing and rescaling an amplitude associated with a KPI among the multiple KPIs. Examples of data filtering techniques include moving average, local regression, Savitzky-Golay, and/or Hamming window. The system can identify the performance issue associated with the 5G wireless telecommunication network by executing multiple machine learning (ML) models based on the KPIs. The multiple machine learning models can be executed as “rApps” in an Open Radio Access Network (RAN) associated with a 5G or higher generation of wireless telecommunication network.

The Open RAN architecture introduces two new types of automation applications, xApps and rApps. RAN automation applications, or rApps, are for automation use cases with more than one-second automation loops. An rApp is designed to run on the non-real-time RAN intelligent controller (RIC) to realize different RAN automation and management use cases, with control loops on a time scale of one second and longer. The disclosed system can complete execution in a matter of minutes or days, and thus can run as an rApp in an Open RAN of a 5G network. On the other hand, xApps work in real near real-time handling events requiring action from 10 milliseconds (ms) to 1 second.

ML model A among the multiple ML models can be configured to identify a sudden performance degradation. ML model B among the multiple ML models can be configured to identify an event leading to a change in a performance trend. The change can be an abrupt change occurring over a course of a day or less. ML model C among the multiple ML models can be configured to identify a gradual change in the performance trend occurring over the course of several days or several months. ML model D among the multiple ML models can be configured to identify whether the cell of the wireless telecommunication network is nearing a capacity limitation associated with the cell. Finally, the system can provide a report based on the identified performance issue.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 (“network 100”) in which aspects of the disclosed technology are incorporated. The network 100 includes base stations 102-1 through 102-4 (also referred to individually as “base station 102” or collectively as “base stations 102”). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
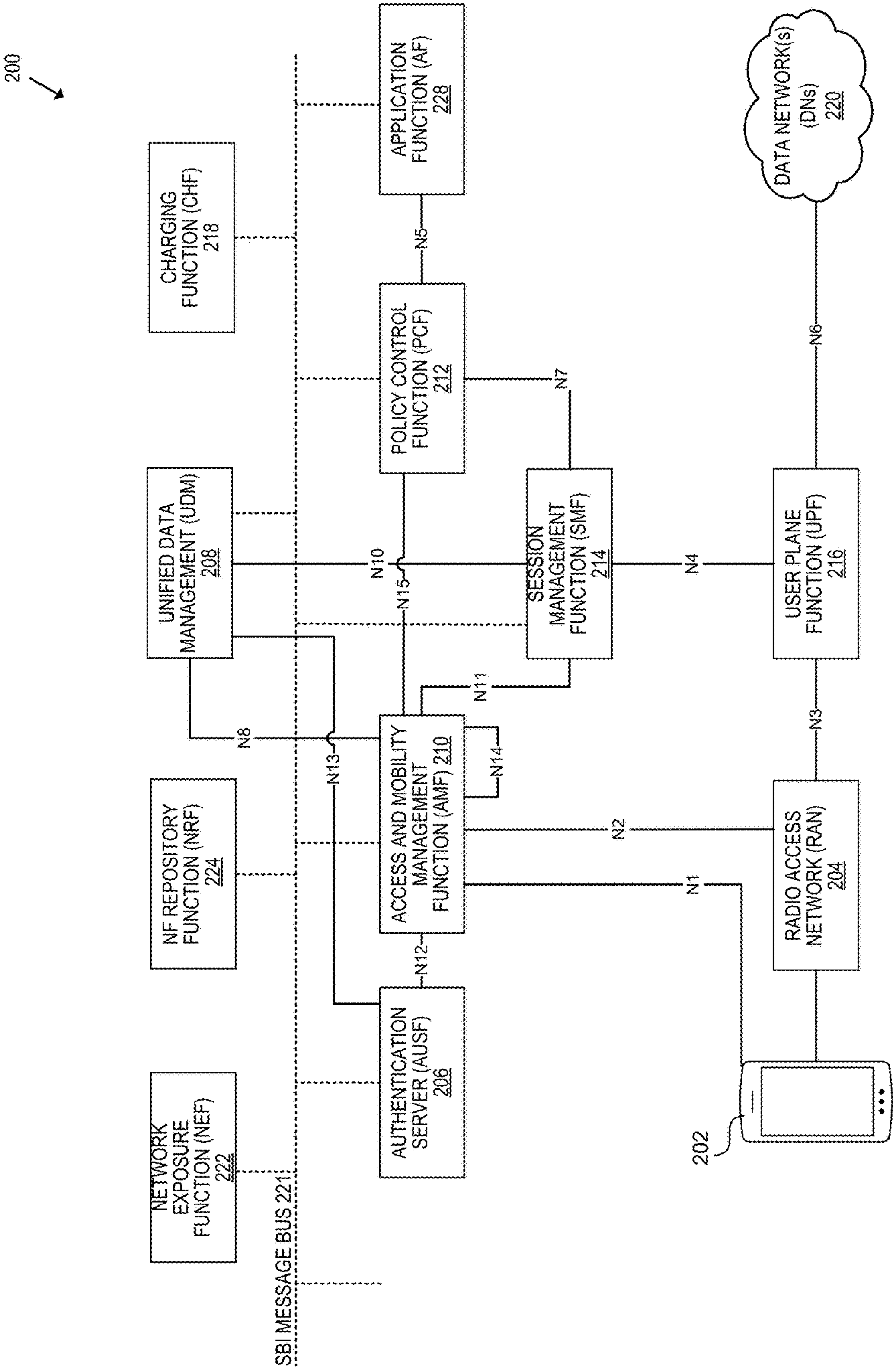
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), serving to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical quality of service (QOS) and charging rules, includes network slice selection, which is regulated by the NSSF 226.

Figure 3:
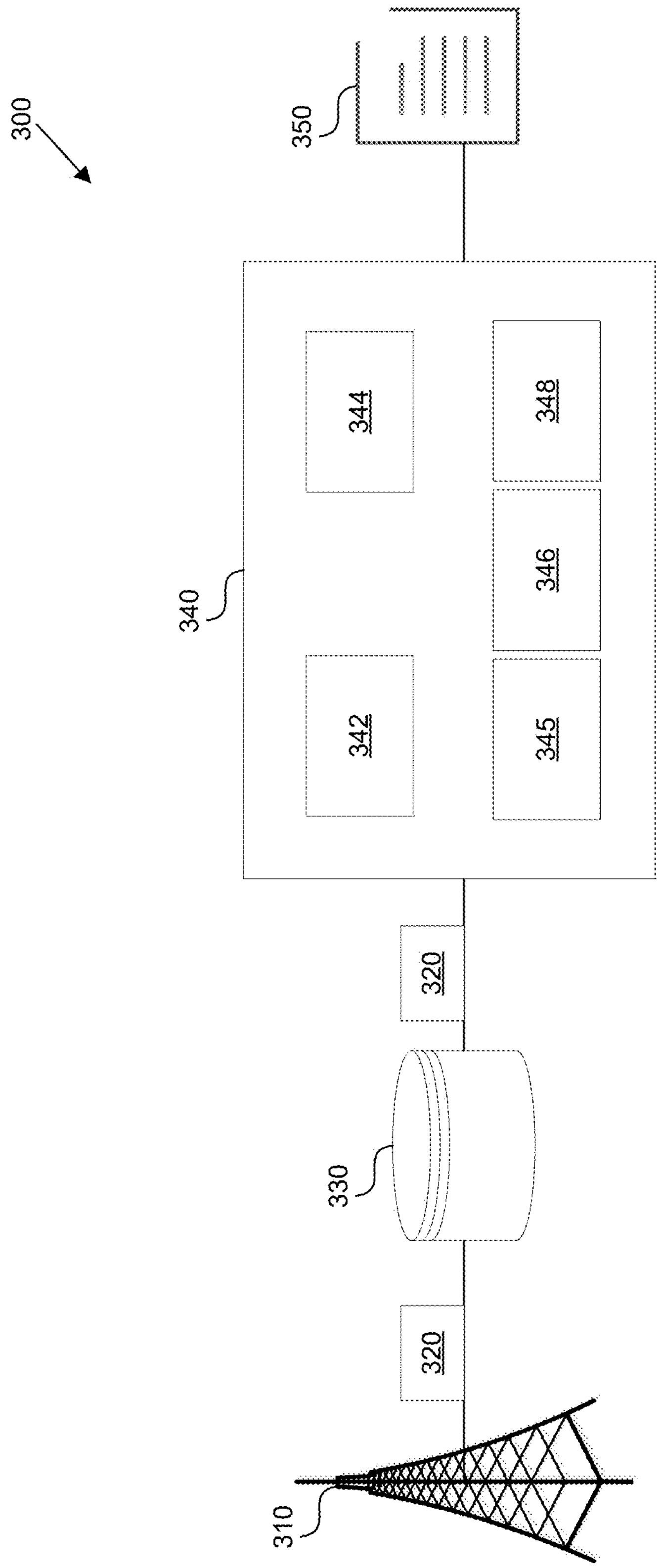
FIG. 3 shows a system to analyze performance of a network.

Identifying a Performance Issue Associated with a 5G Wireless Communication Network FIG. 3 shows a system 300 to analyze performance of a network 100 in FIG. 1. The current approaches for analyzing performance of the network 100 rely on univariate statistical analysis of each network key performance indicator (KPI) separately. Hence, they are dependent on the type of geographical area (urban, suburban, rural, etc.) under observation, as well as time-of-day/day-of-week data, and they require a lot of expert involvement for careful selection of statistical formulas and associated threshold criteria for analyzing each KPI. KPIs can include drop call rate, uplink (UL) packet loss, throughput, congestion, access failure rate, etc., in a specific geographical area. However, due to the spatiotemporally varying nature of the network 100, these approaches are inefficient, provide inconsistent results, and require a lot of operational expenditure.

The disclosed system 300 leverages the advances in machine learning (ML) model and multivariate analysis to efficiently and consistently identify trends that have an impact on network 100 performance by jointly analyzing pattern change in all the KPIs, instead of the conventional manual practice of analyzing one KPI at a time using specific statistical formulas.

Performance-related events and trends can then be automatically identified using past KPI values of each cell, instead of the conventional manual practice of using market-specific and cell-specific statistical formulas. The system 300 is large-scale and scalable because the system is market and cell agnostic and can be applied to any cell 310 in any given market or cluster of cells. The system 300 can be applied across multiple radio access network (RAN) vendor platforms across the whole network 100.

The system 300 can obtain KPIs 320 associated with the cell 310 of the network 100 from a performance management database 330 of the network. The module 340 can preprocess the KPI 320 data, described in this application, prior to providing the KPI to ML models 342, 344, 345, 346, 348 that can analyze the KPI data. Once the analysis is complete, the ML models 342, 344, 345, 346, 348 can generate a report 350, which can be stored on a server. In situations where large amounts of storage and compute performance are required, such as market-level or network-level adoption of the system 300 for analyzing thousands or millions of unique cells in parallel, the system 300 can be running on a cloud.

For example, the system 300 can be used to analyze network performance of a 5G or higher generation network 100. Specifically, the module 340 can run as an rApp in an Open RAN of a 5G network. The Open RAN architecture introduces two new types of automation applications, xApps and rApps. RAN automation applications, or rApps, are for automation use cases with more than one-second automation loops. An rApp is designed to run on the non-real-time RIC to realize different RAN automation and management use cases, with control loops on a time scale of one second and longer. The module 340 can complete execution in a matter of minutes or days, and thus can run as an rApp in an Open RAN of a 5G network.

For example, the system 300 can be a web application, running multiple microservices for different detection scenarios. The ML models 342, 344, 345, 346, 348 can be packaged into a container using a container platform such as Docker. The container application then needs to be run in a scalable and reliable manner using a container management system such as Kubernetes.

The ML models 342, 344, 345, 346, 348 can analyze complex real-world systems using multivariate timeseries analysis. Multivariate timeseries analysis seeks to analyze several timeseries (e.g., KPI streams) jointly. Based on the multivariate timeseries analysis, the ML models 342, 344, 345, 346, 348 can detect the possible presence of interdependencies between related KPIs of the same cell 310. These interdependencies, when quantified appropriately, can lead to improved reliability of forecasts, resulting in more robust and accurate detection models. This is due to the fact that in a network 100, the current KPI state is not only dependent on its past states, but also dependent on the state of other related KPIs. However, performance of such a system is highly dependent on the set of KPIs that are grouped together and requires careful selection (for example, selection of KPIs that have higher interdependencies and correlation). The ML models 342, 344, 345, 346, 348 can detect interdependencies and correlations between the KPIs 320.

Further, ML models 342, 344, 345, 346, 348 can detect and classify problems better than classical methods, due to ML models' ability to support noisy features and noise in the relationships between KPI streams, to handle irrelevant features, and to support complex relationships between different KPIs. The ML models 342, 344, 345, 346, 348 can therefore scale to a large-scale network, because each cell 310 can have its own ML model that is jointly analyzing a set of relevant KPIs 320 and is updated regularly with the incoming performance data.

The ML model 342 can perform multivariate timeseries outlier detection. The ML model 342 can detect an anomaly, such as an abnormal spike/event, in one or more timeseries in a multivariate timeseries data, e.g., KPI 320. The abnormal spike/event can be a step function change to a value of a KPI 320. The ML model 342 can automatically capture and identify sudden degradation in performance within 24 hours of occurrence, using past values of KPI 320 for a given cell 310 or cluster of cells. The ML model 342 can apply multivariate timeseries outlier detection algorithms to automatically detect anomalies by jointly analyzing pattern changes in all KPIs 320.

For example, the ML model 342 can detect whether there is a hardware outage associated with the cell 310. If there is a hardware outage, the KPI 320 can include a large drop in throughput KPI, or a large increase in call drop rate KPI. The large increase can be the step function. Once detected, the ML model 342 can produce the report 350 indicating that there is a performance issue with the cell 310 and the time when the performance issue occurred, for example, the time when the step function appeared in the KPI 320.

The ML model 344 can perform multivariate timeseries change point detection. The ML model 344 can identify times when the probability distribution of one or more timeseries changes, e.g., the change of mean in a multivariate timeseries. The ML model 344 can identify an event that occurred in the past and caused a change in cell performance trend, using past values of KPI 320 for a given cell 310 or cluster of cells. The ML model 344 can apply multivariate timeseries change point detection algorithms to automatically detect change points by jointly analyzing pattern changes in all KPIs 320.

For example, an event that happened in the past can cause the number of UEs to increase in the cell 310, and the throughput per UE to fall. The event can be a failure of a neighboring cell tower, an opening of an office building that is served by the cell 310, etc. The ML model 344 can aid in identifying the time at which the event occurred, such as Jul. 4, 2022. Based on the time at which the event occurred, the ML model 344 can aid in identifying the event, by analyzing all the network events that happened at the particular time.

The ML model 345 can perform multivariate timeseries trend detection. While change point detection performed by the ML model 344 detects a particular change point, such as July 4, the ML model 345 can perform trend detection which includes changes occurring over a longer period of time, such as several days weeks or months. The ML model 345 can identify significant and prolonged changes in one or more timeseries in a multivariate timeseries. Rather than identifying change points, trend detection identifies windows of gradual and prolonged change.

The ML model 345 can identify gradual performance trend change that caused a progressive degradation in performance over a given timeframe, e.g., 30 days, using past values of indicator metrics for a given cell or cluster of cells. The ML model 345 can apply multivariate timeseries trend detection algorithms for identifying gradual trend changes, by jointly analyzing pattern changes in all key performance indicators.

The ML model 346 can perform multivariate timeseries classification. The ML model 346 can distinguish between different types/classes of events in one or more timeseries in a multivariate timeseries data. Multivariate timeseries classification can be used to identify KPIs 320 relevant to a performance goal associated with the network 100. For example, if the performance goal associated with the network 100 is to increase the throughput, the ML model 346 can identify the KPIs relevant to throughput by, for example, identifying average user throughput per UE, average cell throughput per UE on uplink and downlink, maximum throughput per cell on uplink and downlink, subchannel layer throughput on uplink and downlink, etc.

The ML model 348 can perform multivariate timeseries forecasting. The ML model 348 can predict future state/trend of one or more timeseries in a multivariate timeseries data.

The ML model 348 can forecast when the cell 310 will have reached or exceeded its capacity to serve the users and services seeking to connect to it, using past values of indicator metrics. The ML model 348 can apply multivariate timeseries forecasting algorithms for forecasting the cell load/capacity, by jointly analyzing pattern changes in the capacity-related key performance indicators.

For example, the ML model 348 can predict the cells 310 that have a high UE demand at a particular time in the year, or at specific times during the day. More specifically, cells 310 that serve office spaces have higher usage during the day, while the cells 310 that serve residential areas have higher usage during the night. The ML model 348 can predict such usage patterns.

In another example, the ML model 348 can predict at which point of time in the future the cell 310 will exceed its capacity, and notify the network 100 to add more capacity to the cell, shift the UEs to another cell, or add a new cell.

Figure 4:
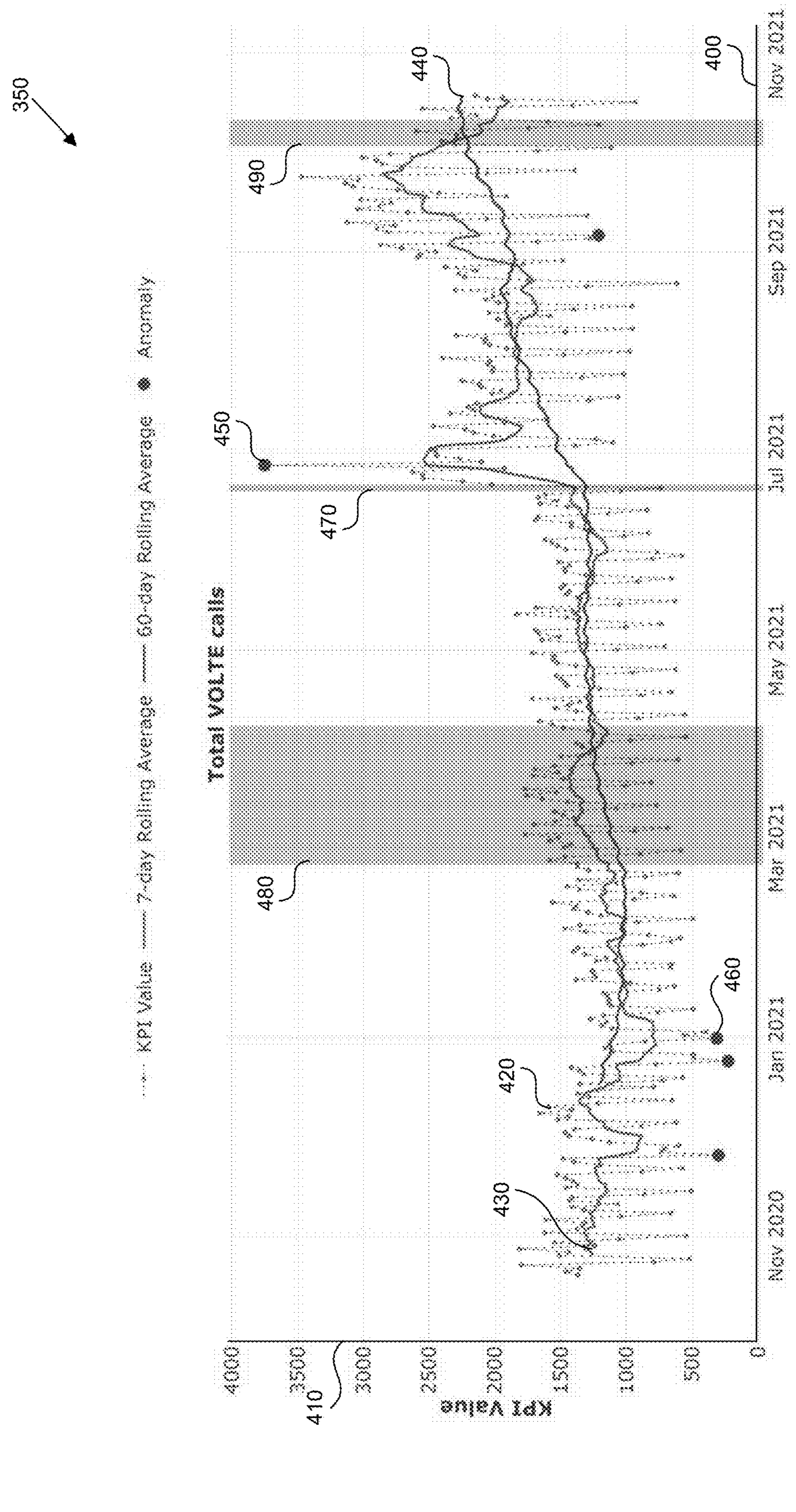
FIG. 4 shows the report including anomalies, change points, and trend changes detected by the ML models.

FIG. 4 shows the report 350 including anomalies, change points, and trend changes detected by the ML models 342, 344, 345 in FIG. 3. The X-axis 400 represents time, while the Y-axis 410 represents a KPI value, e.g., total voice over LTE calls. The graph 420 represents how the KPI value changes over time, i.e., the timeseries of the KPI. The graph 430 is the 7-day rolling average of the KPI value, while the graph 440 is the 60-day rolling average of the KPI value. The dots 450, 460 (only two labeled for brevity) show the anomalies that can be detected by the ML model 342 in FIG. 3. The change point 470 can be detected by the ML model 344 in FIG. 3. As can be seen in the graphs 430, 440, after the change point 470 the value of the KPI has gradually increased.

The windows 480, 490 represent the trend changes that can be detected by the ML model 345 in FIG. 3. As can be seen in the graphs 430, 440, the trend changes 480, 490 occur over a longer period of time than the change point 470. The report 350 can be provided to the user.

Figure 5:
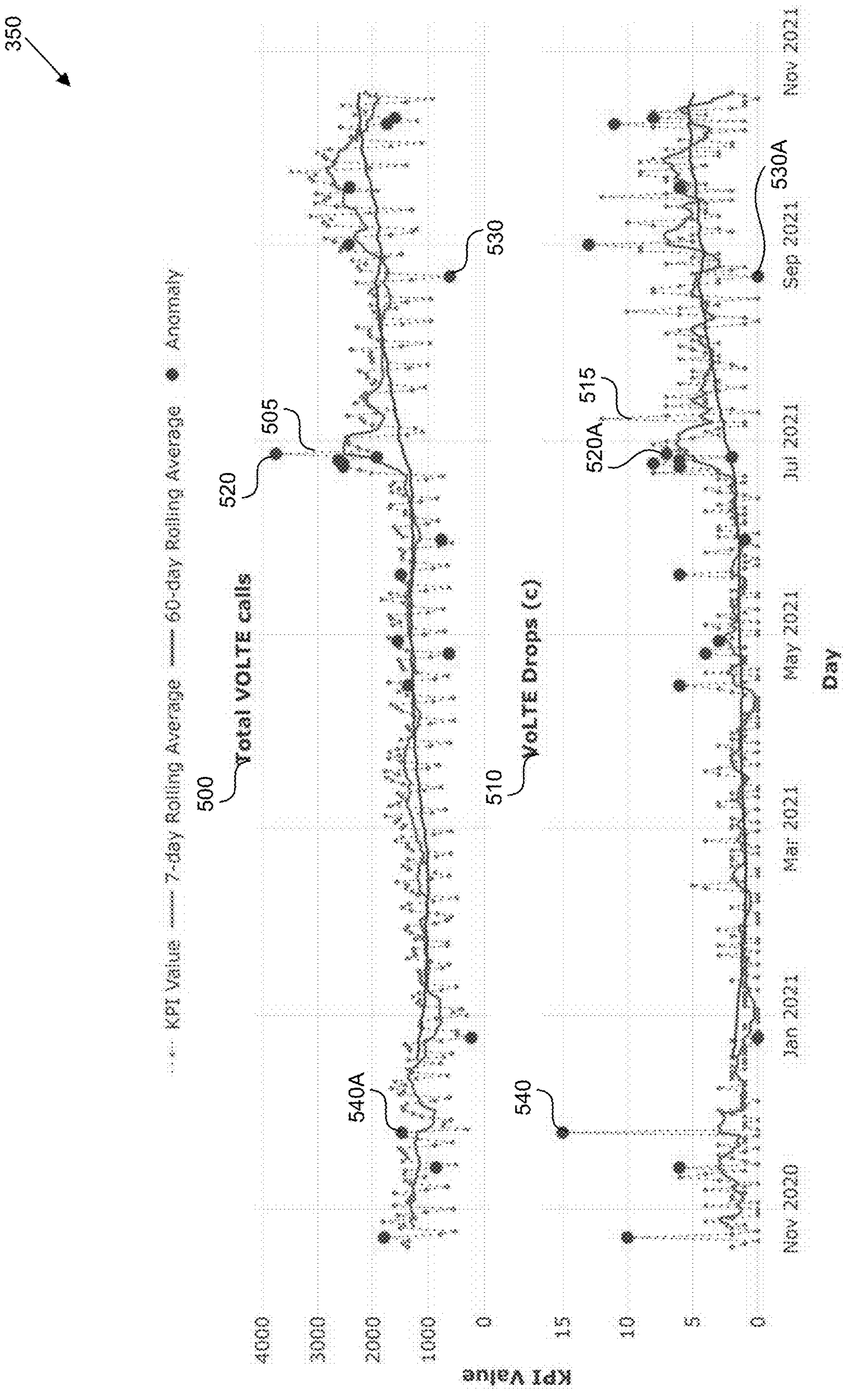
FIG. 5 shows the report of multivariate timeseries analysis detecting an anomaly.

FIG. 5 shows the report 350 of multivariate timeseries analysis detecting an anomaly. The ML model 342 in FIG. 3 can obtain multiple KPIs such as total voice over LTE calls 500 and voice over LTE dropped calls 510. Graphs 505 and 515 show the value over time of the KPIs 500, 510, respectively.

The ML model 342 can jointly analyze the two KPIs 500, 510 to detect anomalies 520, 530, 540 (only three labeled for brevity). The detected anomalies such as 520, 530 can only show up as anomalies in one of the graphs 505, while the detected anomaly 540 can show up as an anomaly in the graph 515. Regardless, the anomalies 520A, 530A, 540A are tagged in the graph in which they are not detected. Specifically, even though anomaly 520 occurs in the graph 505, the anomaly 520A is labeled in the graph 515, even though 520A is not a detected anomaly in the graph 515.

By jointly analyzing two KPIs 500, 510, the ML model 342 can detect interdependencies between related KPIs of the same cell 310 in FIG. 3 and can create robust and accurate detection models using multivariate timeseries analysis. Performance of the ML model 342 is highly dependent on the set of KPIs 500, 510 that are grouped together and requires careful selection of KPIs having higher interdependencies and correlation. The selection of the KPIs can be based on the domain expertise, which can be stored in lookup tables for later retrieval. As explained in this application, if the performance goal is to increase the throughput of the cell 310, the KPIs indicative of the throughput can be recorded in the lookup table and can include average user throughput per UE, average cell throughput per UE on uplink and downlink, etc.

Figure 6:
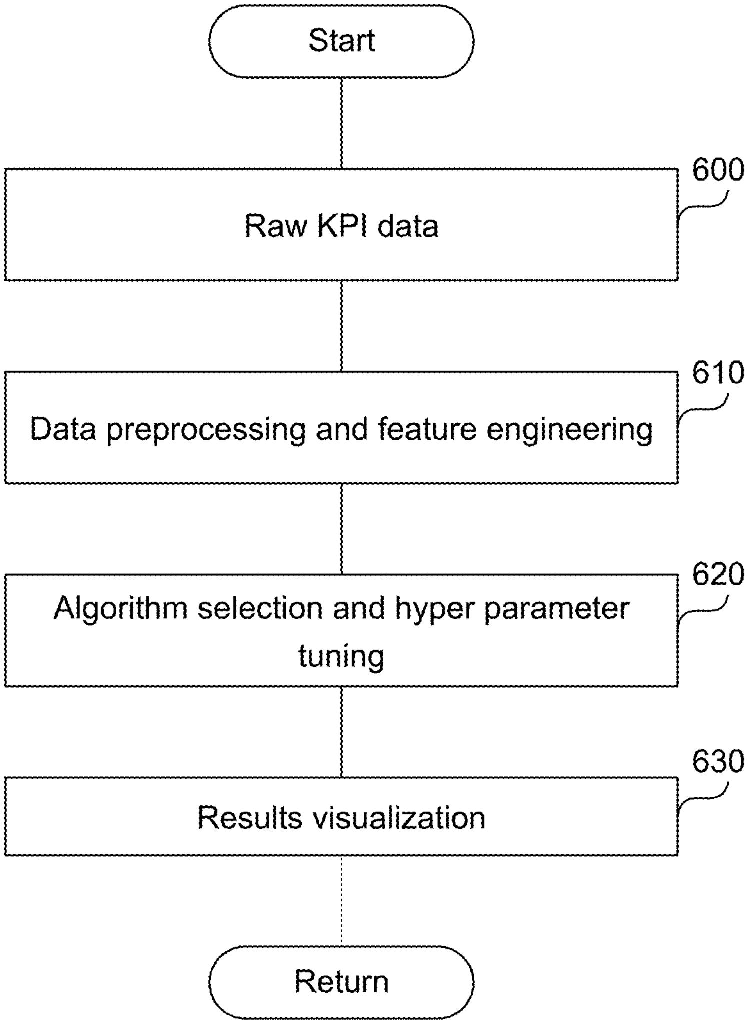
FIG. 6 is a flowchart of end-to-end workflow for the proposed system.

FIG. 6 is a flowchart of end-to-end workflow for the proposed system 300 in FIG. 3. In step 600, a hardware or software processor executing instructions described in this application can start by identifying the subset of KPIs to focus on and fetching the raw KPI data of a cell from the network database.

In step 610, the processor can preprocess the selected data features by smoothing out the noise and normalizing the amplitude of different KPIs to remove noise and bias. Feature engineering may also be done in specific scenarios to incorporate concepts from domain knowledge that can help the machine learning algorithm in learning a complex phenomenon. In addition, the processor can extract multiple features from the multiple KPIs by measuring correlation among the multiple KPIs and representing the correlated KPIs using a single variable. Feature extraction aims to reduce the number of features in a dataset by creating new features from the existing ones (and then discarding the original features). This new reduced set of features should then be able to summarize most of the information contained in the original set of features. In this way, a summarized version of the original features can be created from a combination of the original set.

In step 620, the processor can select the relevant ML algorithm based on the specific detection scenario. At the training phase, the specified ML model is trained by using input data and tuning, e.g. optimizing, its hyperparameters such as window size, trend change, trend direction, number of parameters that are evaluated, the timeframe or window size for analysis e.g. hourly, daily, weekly, depending on the application, etc.).

In step 630, the inference phase, the ML model can output the results, such as identification of anomalies, change points, and trends, and then visualize them on dashboards and generate performance reports, as explained in this application.

Figure 7:
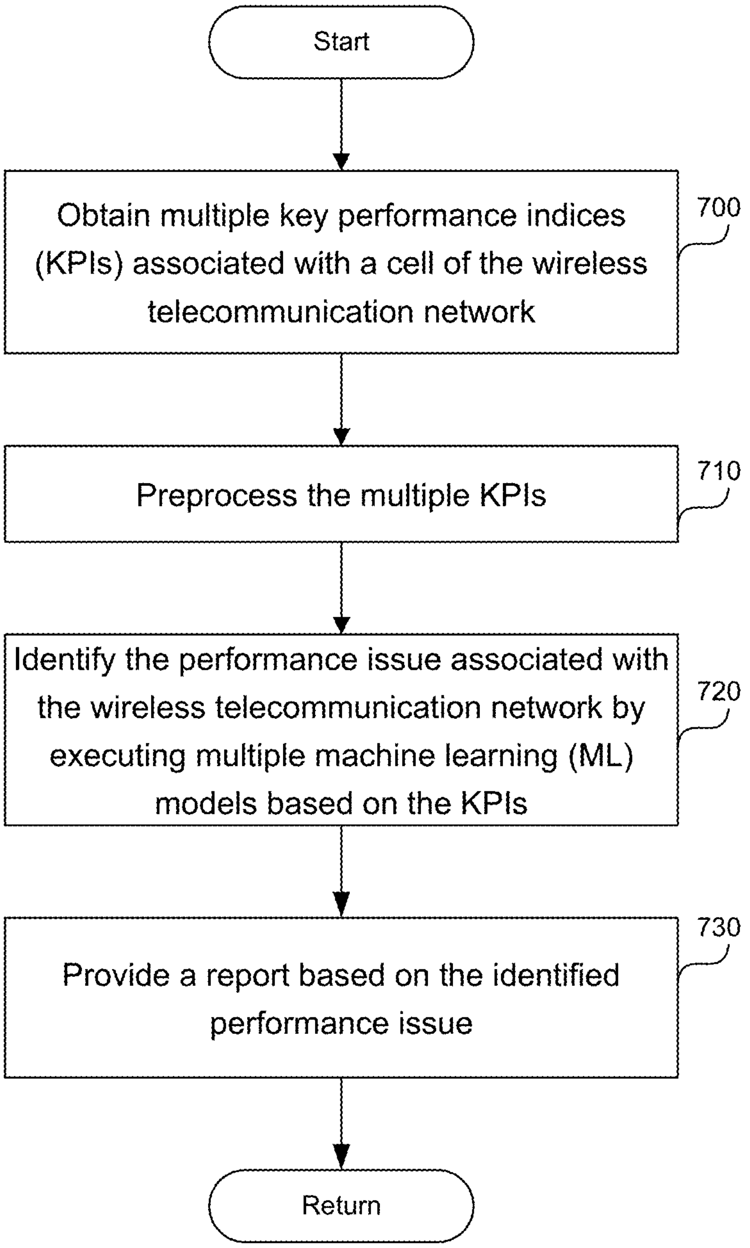
FIG. 7 is a flowchart of a method to identify a performance issue associated with the network, such as a 5G wireless telecommunication network.

FIG. 7 is a flowchart of a method to identify a performance issue associated with the network 100 in FIG. 1, such as a 5G wireless telecommunication network. In step 700, the processor can obtain multiple KPIs associated with a cell of the network 100. The network 100 can be a 5G or higher generation wireless telecommunication network.

In step 710, the processor can preprocess the multiple KPIs by reducing noise associated with the multiple KPIs and normalizing an amplitude associated with a KPI among the multiple KPIs. To reduce the noise associated with the multiple KPIs, the processor can perform data filtering techniques of the values of the multiple KPIs, as described in this application. In addition, the processor can extract multiple features from the multiple KPIs by measuring correlation among the multiple KPIs and representing the correlated KPIs using a single variable, as described in this application.

In step 720, the processor can identify the performance issue associated with the wireless telecommunication network by executing multiple machine learning (ML) models based on the KPIs. The multiple machine learning models can be executed as rApps in an Open RAN associated with a 5G or higher generation of wireless telecommunication network. A first ML model among the multiple ML models can be configured to identify a sudden performance degradation. A second ML model among the multiple ML models can be configured to identify an event leading to an abrupt change, such as a change occurring over a period of days, in a performance trend. A third ML model among the multiple ML models can be configured to identify a gradual change in the performance trend. A fourth ML model among the multiple ML models can be configured to identify whether the cell of the wireless telecommunication network is nearing a capacity limitation associated with the cell.

In step 730, the processor can provide a report based on the identified performance issue.

The processor can automatically determine a desired performance goal associated with the network 100 in FIG. 1 based on forecasts. The processor can obtain a performance goal associated with the wireless telecommunication network, where the performance goal indicates an attribute of the wireless telecommunication network, without indicating a value of the attribute. The attribute of the wireless communication network can be a throughput, congestion, drop call rate, number of users, etc., associated with the network 100. Based on the performance goal, the processor can determine the multiple KPIs indicative of the performance goal. The processor can obtain multiple values associated with the multiple KPIs. Based on the multiple values associated with the multiple KPIs, the processor can perform multivariate timeseries trend forecasting to predict future multiple values associated with the multiple KPIs by analyzing pattern changes among the multiple values associated with the multiple KPIs. Based on the predicted future multiple values, the processor can determine the value associated with the performance goal.

The processor can perform anomaly, e.g., outlier, detection. The processor can obtain a first multiplicity of values associated with the multiple KPIs over a predetermined period of time, such as 24 hours. The processor can obtain a second multiplicity of values associated with the multiple KPIs preceding the predetermined period of time. The processor can perform multivariate timeseries outlier detection to automatically detect anomalies by analyzing pattern changes among the first multiplicity of values and the second multiplicity of values, where the multivariate timeseries includes the first multiplicity of values and the second multiplicity of values.

The processor can perform change point detection. The processor can obtain multiple values associated with the multiple KPIs, where the multiple KPIs are associated with the cell or multiple cells of the wireless telecommunication network. The processor can perform multivariate timeseries change point detection to automatically detect change points by jointly analyzing pattern changes among the multiple values associated with the multiple KPIs, where the multivariate timeseries includes the multiple values associated with the multiple KPIs.

The processor can perform trend detection. The processor can obtain multiple values associated with the multiple KPIs over a predetermined timeframe, such as 30 days, where the multiple KPIs are associated with the cell or multiple cells of the wireless telecommunication network. The processor can perform multivariate timeseries trend detection to automatically detect gradual trend changes by jointly analyzing pattern changes among the multiple values associated with the multiple KPIs, where the multivariate timeseries includes the multiple values associated with the multiple KPIs.

The processor can perform trend forecasting. The processor can obtain multiple values associated with the multiple KPIs, where the multiple KPIs indicate a load associated with the cell or a capacity associated with the cell. The processor can perform multivariate timeseries trend forecasting to predict the load associated with the cell or the capacity associated with the cell by jointly analyzing pattern changes among the multiple values associated with the multiple KPIs, where the multivariate timeseries includes the multiple values associated with the multiple KPIs.

The processor can determine which KPIs to analyze to reach a desired performance goal associated with the network. The processor can obtain a desired performance goal associated with the cell of the wireless telecommunication network, such as high throughput, low congestion. For example, if the desired performance goal is throughput optimization, then there are several KPIs that can indicate the throughput of the cell. The relationship between the desired performance goal, such as throughput, and the indicative KPIs can be stored in a database, such as a lookup table. The processor can retrieve the indicative KPIs upon receiving the desired performance goal. The processor can determine the multiple KPIs associated with the desired performance goal. The processor can obtain the multiple KPIs from a lookup table, or from an engineer specifying the necessary KPIs. If the desired performance goal is throughput, the indicative KPIs can include average user throughput per UE, average cell throughput per UE on upload or download, maximum throughput of a cell on upload or download, subchannel layer throughput on upload or download, etc. The desired performance goal can include hundreds or even thousands of indicative KPIs. The processor can obtain the multiple KPIs associated with the cell of the wireless telecommunication network.

The processor can train the multiple ML models to identify the performance issue associated with the wireless telecommunication network by adjusting multiple hyperparameters associated with the multiple ML models, where the multiple hyperparameters include a window size, a trend change, or trend direction.

The processor can allow the user to choose which machine learning model to run. The processor can receive an input from a user indicating which of the multiple ML models to execute. Upon receiving the input from the user, the processor can execute the indicated ML model.

Figure 8:
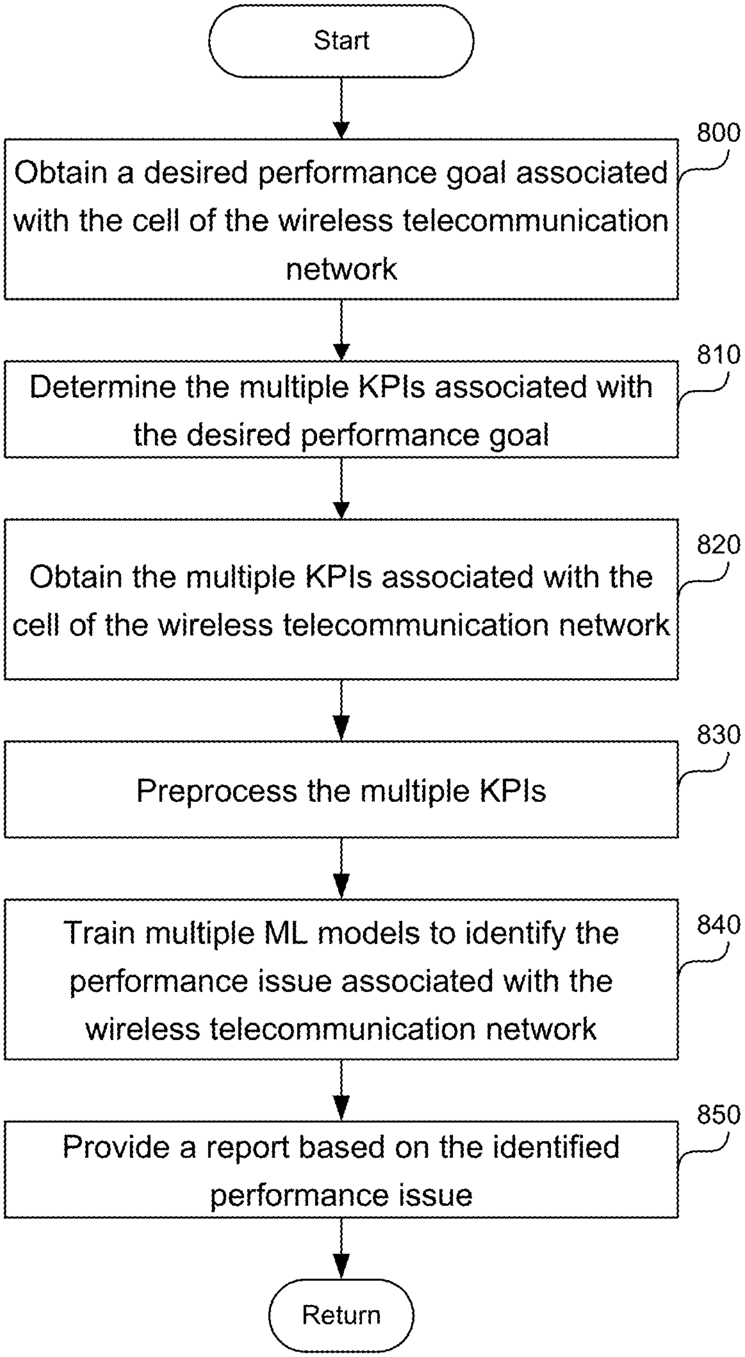
FIG. 8 is a flowchart of a method to train the multiple ML models.

FIG. 8 is a flowchart of a method to train the multiple ML models. In step 800, the processor can obtain a desired performance goal associated with the cell of the wireless telecommunication network such as high throughput, low congestion, etc.

In step 810, the processor can determine the multiple KPIs associated with the desired performance goal. The processor can obtain the multiple KPIs from a lookup table, or from an engineer specifying the KPIs necessary such as average user throughput per UE, average cell throughput per UE on upload or download, maximum throughput of a cell on upload or download, subchannel layer throughput, etc. The multiple KPIs can include more than 300 KPIs.

In step 820, the processor can obtain the multiple KPIs associated with the cell of the wireless telecommunication network. The wireless telecommunication network can be a 5G or higher generation wireless telecommunication network.

In step 830, the processor can preprocess the multiple KPIs by reducing noise associated with the multiple KPIs, and normalizing an amplitude associated with a KPI among the multiple KPIs.

In step 840, the processor can train multiple ML models to identify the performance issue associated with the wireless telecommunication network by adjusting multiple hyperparameters associated with the multiple ML models, where the multiple hyperparameters include a window size, a trend change, or trend direction. The multiple machine learning models can be executed as rApps in an Open RAN associated with a 5G or higher generation of wireless telecommunication network. A first ML model among the multiple ML models can be configured to identify a sudden performance degradation. A second ML model among the multiple ML models can be configured to identify an event leading to an abrupt change, such as a change occurring within 24 hours, in a performance trend. A third ML model among the multiple ML models can be configured to identify a gradual change in the performance trend. A fourth ML model among the multiple ML models can be configured to identify whether the cell of the wireless telecommunication network is nearing a capacity limitation associated with the cell.

In step 850, the processor can provide a report based on the identified performance issue. In addition, the processor can train individual models described in this application, and perform additional steps described in this application.

Computer System

Figure 9:
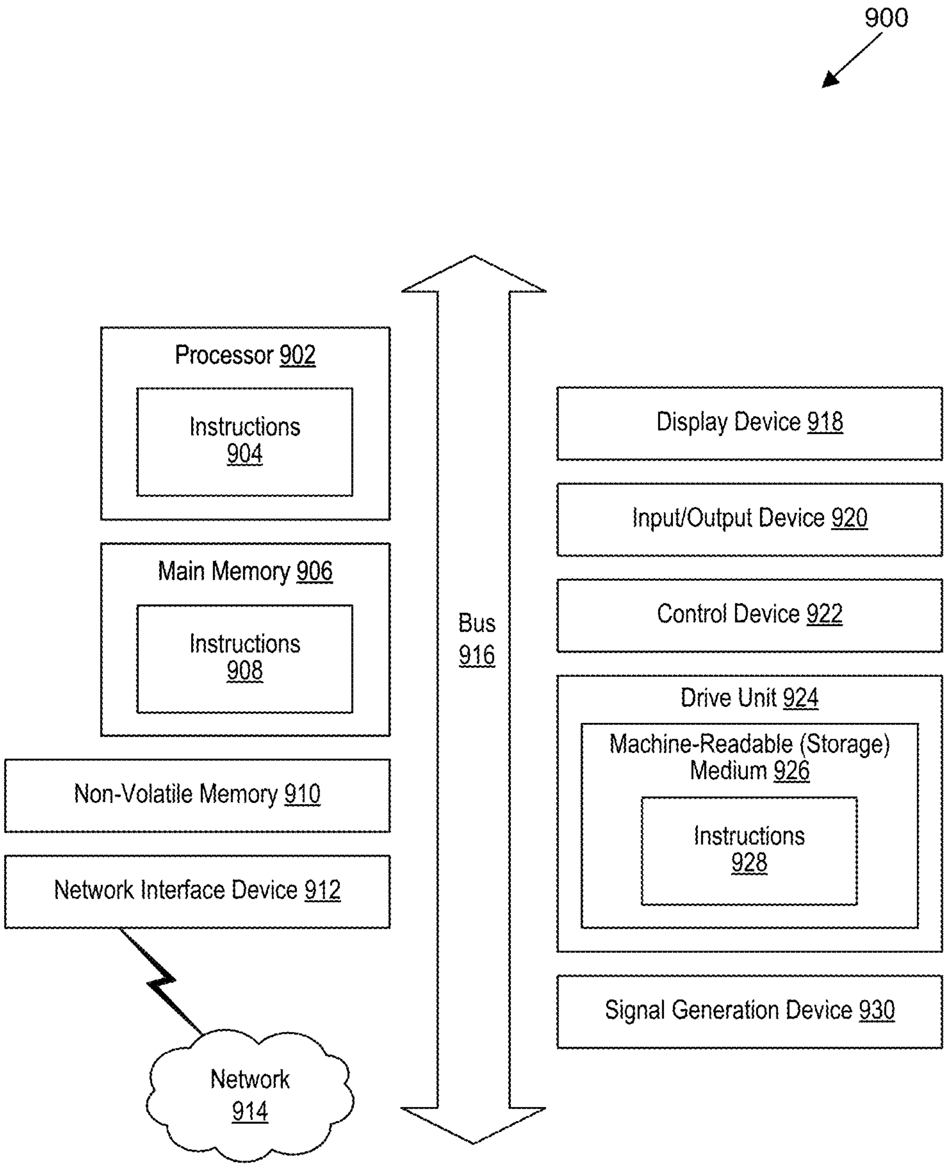
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, a video display device 918, an input/output device 920, a control device 922 (e.g., keyboard and pointing device), a drive unit 924 that includes a storage medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the Figures and any other components described in this specification can be implemented.

The computer system 900 can take any suitable physical form. For example, the computer system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 900. In some implementations, the computer system 900 can be an embedded computer system, a system-on-chip (SOC), a single-board computer system (SBC), or a distributed system such as a mesh of computer systems, or it can include one or more cloud components in one or more networks. Where appropriate, one or more computer systems 900 can perform operations in real time, near real time, or in batch mode.

The network interface device 912 enables the computer system 900 to mediate data in a network 914 with an entity that is external to the computer system 900 through any communication protocol supported by the computer system 900 and the external entity. Examples of the network interface device 912 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computer system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computer system 900 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and, such references can mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions to identify a performance issue associated with a 5G wireless telecommunication network recorded thereon, wherein the instructions, when executed by at least one data processor of a system, cause the system to:

obtain multiple key performance indices (KPIs) associated with a cell of the 5G wireless telecommunication network;

identify the performance issue associated with the 5G wireless telecommunication network by executing multiple machine learning (ML) models based on the multiple KPIs, wherein each of the multiple ML models are configured to identify a sudden performance degradation, an event leading to a change in a performance trend, a gradual change in the performance trend, or a capacity limitation associated with the cell, and wherein the multiple ML models are configured to filter noise associated with the multiple KPIs; and provide a report based on the identified performance issue.

2. The non-transitory, computer-readable storage medium of claim 1, wherein the instructions further cause the system to:

obtain a performance goal associated with the 5G wireless telecommunication network, wherein the performance goal indicates an attribute of the 5G wireless telecommunication network, without indicating a value of the attribute;

based on the performance goal, determine the multiple KPIs indicative of the performance goal;

obtain multiple values associated with the multiple KPIs; and based on the multiple values associated with the multiple KPIs, perform multivariate timeseries trend forecasting to predict future multiple values associated with the multiple KPIs by analyzing pattern changes among the multiple values associated with the multiple KPIs; and based on the predicted future multiple values, determine the value associated with the performance goal.

3. The non-transitory, computer-readable storage medium of claim 1, wherein a ML model of the multiple ML models comprises instructions to:

obtain a first multiplicity of values associated with the multiple KPIs over a predetermined period of time;

obtain a second multiplicity of values associated with the multiple KPIs preceding the predetermined period of time; and perform multivariate timeseries outlier detection to automatically detect anomalies by analyzing pattern changes among the first multiplicity of values and the second multiplicity of values, wherein the multivariate timeseries includes the first multiplicity of values and the second multiplicity of values.

4. The non-transitory, computer-readable storage medium of claim 1, wherein a ML model of the multiple ML models comprises instructions to:

obtain multiple values associated with the multiple KPIs, wherein the multiple KPIs are associated with the cell or multiple cells of the 5G wireless telecommunication network; and perform multivariate timeseries change point detection to automatically detect change points by jointly analyzing pattern changes among the multiple values associated with the multiple KPIs, wherein the multivariate timeseries includes the multiple values associated with the multiple KPIs.

5. The non-transitory, computer-readable storage medium of claim 1, wherein a ML model of the multiple ML models comprises instructions to:

obtain multiple values associated with the multiple KPIs over a predetermined timeframe, wherein the multiple KPIs are associated with the cell or multiple cells of the 5G wireless telecommunication network; and perform multivariate timeseries trend detection to automatically detect gradual trend changes by jointly analyzing pattern changes among the multiple values associated with the multiple KPIs, wherein the multivariate timeseries includes the multiple values associated with the multiple KPIs.

6. The non-transitory, computer-readable storage medium of claim 1, wherein a ML model of the multiple ML models comprises instructions to:

obtain multiple values associated with the multiple KPIs, wherein the multiple KPIs indicate a load associated with the cell or a capacity associated with the cell; and perform multivariate timeseries trend forecasting to predict the load associated with the cell or the capacity associated with the cell by jointly analyzing pattern changes among the multiple values associated with the multiple KPIs, wherein the multivariate timeseries includes the multiple values associated with the multiple KPIs.

7. A system comprising:

at least one hardware processor; and at least one non-transitory memory storing instructions, which, when executed by the at least one hardware processor, cause the system to:

obtain multiple KPIs associated with a cell of a wireless telecommunication network;

identify a performance issue associated with a 5G wireless telecommunication network by executing multiple machine learning (ML) models based on the multiple KPIs, wherein each of the multiple ML models are configured to identify a sudden performance degradation, an event leading to a change in a performance trend, a gradual change in the performance trend, or a capacity limitation associated with the cell, and wherein the multiple ML models are configured to filter noise associated with the multiple KPIs; and provide a report based on the identified performance issue.

8. The system of claim 7, wherein the instructions further cause the system to:

obtain a performance goal associated with the wireless telecommunication network, wherein the performance goal indicates an attribute of the wireless telecommunication network, without indicating a value of the attribute;

based on the performance goal, determine the multiple KPIs indicative of the performance goal;

obtain multiple values associated with the multiple KPIs; and based on the multiple values associated with the multiple KPIs, perform multivariate timeseries trend forecasting to predict future multiple values associated with the multiple KPIs by analyzing pattern changes among the multiple values associated with the multiple KPIs; and based on the predicted future multiple values, determine the value associated with the performance goal.

9. The system of claim 7, wherein a ML model of the multiple ML models comprises instructions to:

obtain a first multiplicity of values associated with the multiple KPIs over a predetermined period of time;

obtain a second multiplicity of values associated with the multiple KPIs preceding the predetermined period of time; and perform multivariate timeseries outlier detection to automatically detect anomalies by analyzing pattern changes among the first multiplicity of values and the second multiplicity of values, wherein the multivariate timeseries includes the first multiplicity of values and the second multiplicity of values.

10. The system of claim 7, wherein a ML model of the multiple ML models comprises instructions to:

obtain multiple values associated with the multiple KPIs, wherein the multiple KPIs are associated with the cell or multiple cells of the wireless telecommunication network; and perform multivariate timeseries change point detection to automatically detect change points by jointly analyzing pattern changes among the multiple values associated with the multiple KPIs, wherein the multivariate timeseries includes the multiple values associated with the multiple KPIs.

11. The system of claim 7, wherein a ML model of the multiple ML models comprises instructions to:

obtain multiple values associated with the multiple KPIs over a predetermined timeframe, wherein the multiple KPIs are associated with the cell or multiple cells of the wireless telecommunication network; and perform multivariate timeseries trend detection to automatically detect gradual trend changes by jointly analyzing pattern changes among the multiple values associated with the multiple KPIs, wherein the multivariate timeseries includes the multiple values associated with the multiple KPIs.

12. The system of claim 7, wherein a ML model of the multiple ML models comprises instructions to:

obtain multiple values associated with the multiple KPIs, wherein the multiple KPIs indicate a load associated with the cell or a capacity associated with the cell; and perform multivariate timeseries trend forecasting to predict the load associated with the cell or the capacity associated with the cell by jointly analyzing pattern changes among the multiple values associated with the multiple KPIs, wherein the multivariate timeseries includes the multiple values associated with the multiple KPIs.

13. The system of claim 7, wherein the instructions further cause the system to:

obtain a desired performance goal associated with the cell of the wireless telecommunication network;

determine the multiple KPIs associated with the desired performance goal; and obtain the multiple KPIs associated with the cell of the wireless telecommunication network.

14. The system of claim 7, wherein the instructions further cause the system to:

train the multiple ML models to identify the performance issue associated with the wireless telecommunication network by adjusting multiple hyperparameters associated with the multiple ML models, wherein the multiple hyperparameters include a window size, a trend change, or trend direction.

15. The system of claim 7, wherein the instructions further cause the system to:

receive an input from a user indicating which of the multiple ML models to execute; and upon receiving the input from the user, execute the indicated ML model.

16. A method of identifying a performance issue associated with a 5G wireless telecommunication network system, the method comprising:

obtaining multiple key performance indices (KPIs) associated with a cell of the 5G wireless telecommunication network;

identifying the performance issue associated with the 5G wireless telecommunication network by executing multiple machine learning (ML) models based on the multiple KPIs, wherein each of the multiple ML models are configured to identify a sudden performance degradation, an event leading to a change in a performance trend, a gradual change in the performance trend, or a capacity limitation associated with the cell, and wherein the multiple ML models are configured to filter noise associated with the multiple KPIs; and providing a report based on the identified performance issue.

17. The method of claim 16, further comprising:

obtaining a performance goal associated with the 5G wireless telecommunication network, wherein the performance goal indicates an attribute of the 5G wireless telecommunication network, without indicating a value of the attribute;

based on the performance goal, determining the multiple KPIs indicative of the performance goal;

obtaining multiple values associated with the multiple KPIs; and based on the multiple values associated with the multiple KPIs, performing multivariate timeseries trend forecasting to predict future multiple values associated with the multiple KPIs by analyzing pattern changes among the multiple values associated with the multiple KPIs; and based on the predicted future multiple values, determine the value associated with the performance goal.

18. The method of claim 16, further comprising:

obtaining a first multiplicity of values associated with the multiple KPIs over a predetermined period of time;

obtaining a second multiplicity of values associated with the multiple KPIs preceding the predetermined period of time; and performing multivariate timeseries outlier detection to automatically detect anomalies by analyzing pattern changes among the first multiplicity of values and the second multiplicity of values, wherein the multivariate timeseries includes the first multiplicity of values and the second multiplicity of values.

19. The method of claim 16, further comprising:

obtaining multiple values associated with the multiple KPIs, wherein the multiple KPIs are associated with the cell or multiple cells of the 5G wireless telecommunication network; and performing multivariate timeseries change point detection to automatically detect change points by jointly analyzing pattern changes among the multiple values associated with the multiple KPIs, wherein the multivariate timeseries includes the multiple values associated with the multiple KPIs.

20. The method of claim 16, comprising instructions to:

obtaining multiple values associated with the multiple KPIs over a predetermined timeframe, wherein the multiple KPIs are associated with the cell or multiple cells of the 5G wireless telecommunication network; and performing multivariate timeseries trend detection to automatically detect gradual trend changes by jointly analyzing pattern changes among the multiple values associated with the multiple KPIs, wherein the multivariate timeseries includes the multiple values associated with the multiple KPIs.

* * * * *